United States Patent
Schless

(12) 
(10) Patent No.: US 6,691,813 B2
(45) Date of Patent: Feb. 17, 2004

(54) FRAMES FOR ELECTRIC MOTOR DRIVEN CYCLES

(75) Inventor: Ely Schless, Ashland, OR (US)

(73) Assignee: The Electric Cycle Company, Los Angeles, CA (US)

(*) Notice: Subject to any disclaimer, the term of this patent is extended or adjusted under 35 U.S.C. 154(b) by 0 days.

(21) Appl. No.: 10/147,630

(22) Filed: May 16, 2002

(65) Prior Publication Data

US 2003/0213631 A1 Nov. 20, 2003

(51) Int. Cl.[7] ................................................. B62M 7/00
(52) U.S. Cl. ...................................... 180/220; 280/288.3
(58) Field of Search ................................ 180/220, 227, 180/225, 219; 280/288.3, 274, 281.1; D12/111

(56) References Cited

U.S. PATENT DOCUMENTS

| 1,479,738 | A | * | 1/1924 | Pullin | 180/225 |
|---|---|---|---|---|---|
| 2,182,828 | A | * | 12/1939 | Stutsman | 280/288.3 |
| 2,493,037 | A | * | 1/1950 | Simon | 280/288.3 |
| 3,554,311 | A | * | 1/1971 | Thompson | 280/288.3 |
| 4,139,072 | A | * | 2/1979 | Dawson | 180/219 |
| 4,368,897 | A | * | 1/1983 | Brown | 280/202 |
| 5,101,924 | A | * | 4/1992 | Yamagiwa | 180/220 |
| 5,109,942 | A | * | 5/1992 | Akimori | 280/288.3 |
| 5,207,288 | A | * | 5/1993 | Ono | 180/220 |
| 5,505,493 | A | * | 4/1996 | Camfield | 280/288.4 |
| 5,657,830 | A | * | 8/1997 | Kawashima | 180/220 |
| D383,100 | S | * | 9/1997 | Lee | D12/111 |
| 6,296,072 | B1 | * | 10/2001 | Turner | 180/220 |

* cited by examiner

Primary Examiner—Daniel G. DePumpo
(74) Attorney, Agent, or Firm—McDermott Will & Emery

(57) ABSTRACT

An electric motor driven cycle having front and rear wheels, and a monocoque frame suspended between the front and rear wheels. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

14 Claims, 4 Drawing Sheets

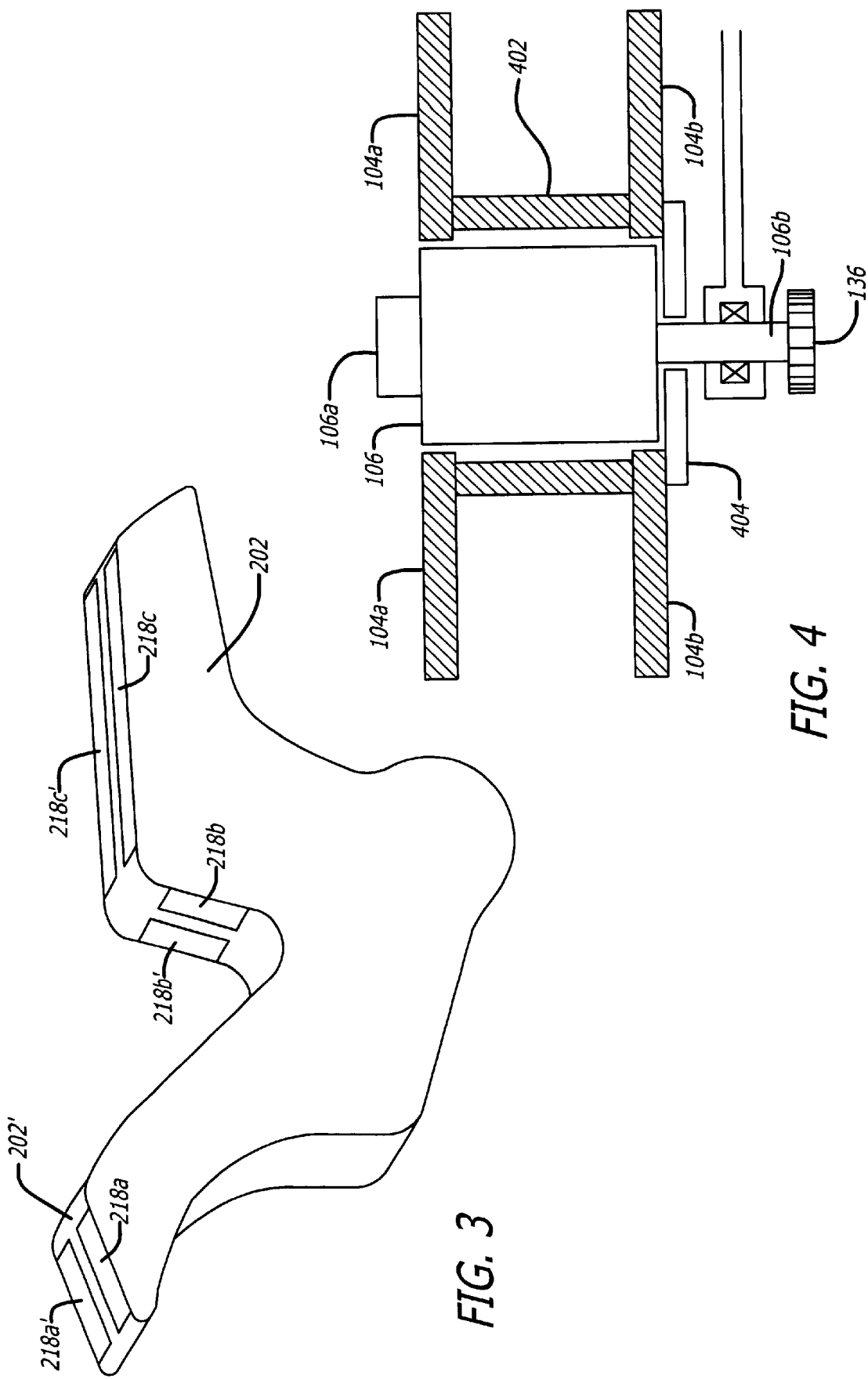

FRAMES FOR ELECTRIC MOTOR DRIVEN CYCLES

BACKGROUND OF THE INVENTION

1. Field

The present invention relates to power driven cycles, and more specifically, to frames for electric motor driven cycles.

2. Background

Recently, due to the shortage of gasoline and the ecological consequences of such use, various proposals have been created dealing with alternative power sources for motor vehicles. One of the most popular and promising proposals relates to electric powered vehicles. The difficulty encountered with electric powered vehicles, however, is the inability to deliver sufficient power for long-range operation without utilizing an extremely large number of heavy batteries. This is due largely to the weight requirements of conventional automobiles. The cycle, on the other hand, is substantially lighter than the automobile, and therefore, tends to have significantly lower power requirements. As a result, cycles, such as motorcycles and bicycles, are ideal for electric power applications.

Conventional electric motor driven cycles have typically employed heavy tube frame structures with an array of brackets to support the batteries and the electric motor. This construction often results in a mass fraction for the electric motor driven cycle that is less than optimal. "Mass fraction" refers to the percentage that the batteries contribute to the overall weight of the electric motor driven cycle. Increased performance in terms of extended range can often be obtained by increasing the mass fraction. One way to increase the mass fraction is to reduce the weight of the frame. This tends to increase the range of the electric motor driven cycle for a given battery weight. Accordingly, a lightweight frame construction is needed with sufficient rigidity to support the weight of the batteries and motor.

SUMMARY

In one aspect of the present invention, an electric motor driven cycle includes front and rear wheels, and a monocoque frame suspended between the front and rear wheels.

In another aspect of the present invention, an electric motor driven vehicle comprises front and rear wheels, a monocoque frame suspended between the front and rear wheels, and a handle bar extending from the frame.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 3 is a perspective view of two exemplary machined cut metal sheets illustrating the assembly of the right and left portions of the frame for an electric motor driven cycle FIG. 4 is a cross-section top view of an exemplary mounting configuration for the electric motor.

DETAILED DESCRIPTION

The detailed description set forth below in connection with the appended drawings is intended as a description of exemplary embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown generally in order to avoid obscuring the concepts of the present invention.

Figure 1:
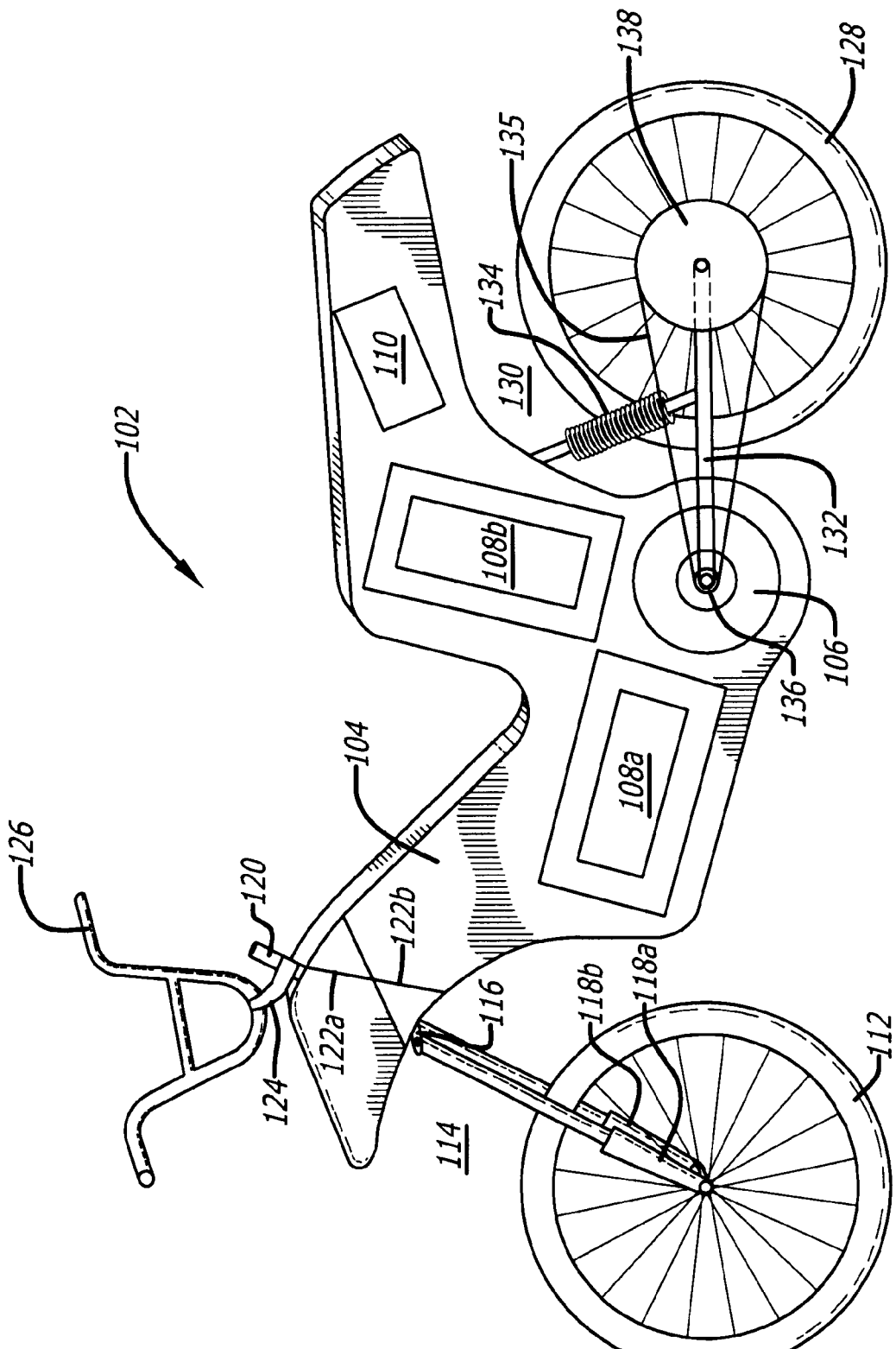
FIG. 1 is a perspective view of an exemplary electric motor driven cycle.

FIG. 1 is a perspective view of an exemplary electric motor driven cycle. The electric motor driven cycle 102 is based on a fully suspended and dampened monocoque frame design. A monocoque frame is a type of construction in which the outer surface bears all or a major portion of the stresses. The monocoque frame 104 can be formed as a unitary structure with one or more compartments to house the internal components of the electric motor driven cycle 102. The internal components include an electric motor 106 powered by dual batteries 108a and 108b, and a battery charger 110 to periodically charge the batteries 108a and 108b.

The monocoque frame 104 has a lightweight construction with sufficient rigidity to support the internal components. As a result, the mass fraction of the electric motor driven cycle 102 can be optimized for higher performance in terms of extended range capability. In addition, the monocoque frame provides a high degree of design flexibility with respect to the location of the internal components within the frame. As a result, the designer can strategically position the internal components for optimal performance. By way of example, the batteries 108a and 108b can positioned within the frame 104 to provide good weight distribution to improve handling during operation. The electric motor 106 can be positioned within the frame 104 to optimize power delivery to the electric motor driven cycle 102. The electric motor 106 can also be strategically positioned to provide a structural support member for the frame. In the exemplary embodiment of FIG. 1, the electric motor 104 serves as a load bearing element that supports the weight of the passenger while withstanding the bending stresses created by the electric motor driven cycle 102 during turns during operation. By using the electric motor 106, or any other internal component, as a structural element of the frame 104, the weight of the frame can be further reduced thereby increasing the mass fraction of the electric motor driven cycle 102. In contrast, the conventional tube frame construction may have severe limitations with regard to the location of the internal components due to the bracket arrangements needed to support those components.

The frame 104 can be coupled to a front wheel 112 with a front fork assembly 114. The front fork assembly 114 includes a bifurcated member 116 with right and left spring loaded damping tubes 118a and 118b extending downward to form a front fork. The axle of the front wheel 112 can be inserted into the front fork. A steered tube 120 extending upward from the center of the bifurcated member 116 can be rotatably inserted through the frame 104 with upper and lower bearings (not shown). Right and left cross-members 122a and 122b can be secured to the frame 104 to prevent buckling due to compressive loading between the two bearing points. A clamp 124 can be used to couple the steered tube 120 to a handle bar 126.

The frame 104 can be coupled to a rear wheel 128 with a rear suspension system 130. The rear suspension system 130 includes a swing arm 132 connecting the axle of the rear wheel 128 to the drive shaft of the motor 106. Alternatively, the swing arm 132 can be connected between the frame 104 and the rear wheel axle. A shock absorber 134 can be connected across the frame 104 and the swing arm 132 to absorb the energy produced by sudden bumps in the road.

Power can be delivered to the rear wheel 128 with a belt drive assembly between the electric motor 106 and the rear wheel 128. A drive belt 135 can be connected between a toothed pulley 136 at the end of the motor drive shaft and a toothed drive wheel 138 extending from the rear wheel axle. The toothed configuration of both the pulley and drive wheel tends to reduce slippage during rapid accelerations and decelerations. A drive belt can be used instead of a drive chain in applications where noise suppression is desirable. In applications where the swing arm 132 is connected between the frame 104 and the rear wheel axle, an idler tensioner (not shown) may be used to regulate the tension of the drive belt 135 as the swing arm moves in response to sudden bumps in the road.

Figure 2:
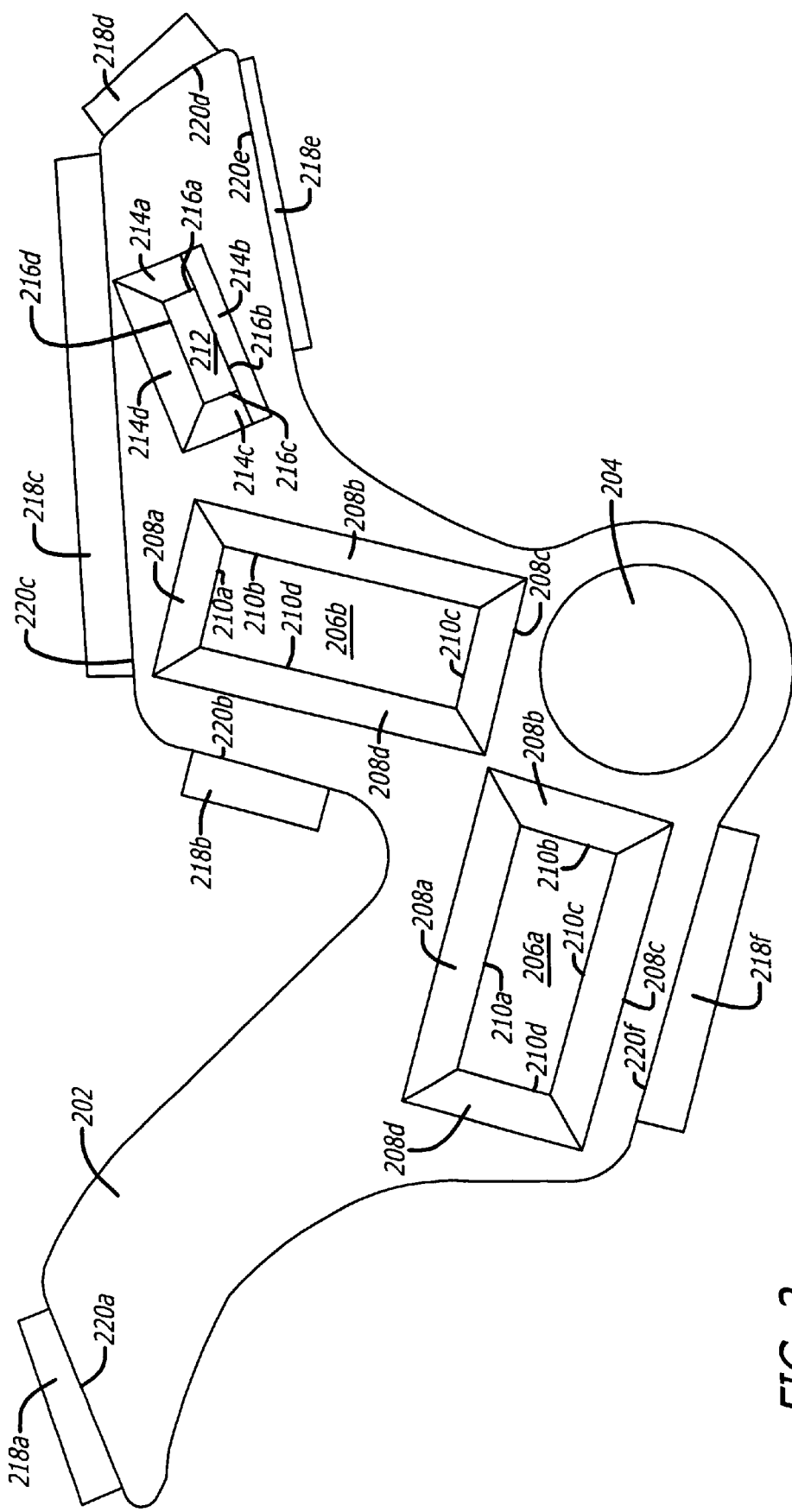
FIG. 2 is a side view of an exemplary machined cut metal sheet for either the right of left side of the of a frame for an electric motor driven cycle.

The frame can be constructed from a pair of machined metal sheets which are shaped and connected together to form a monocoque structure. An exemplary machined cut metal sheet for either the right or left side of the frame is shown in FIG. 2. The metal sheet can be mild steel, stainless steel, chrome-molly steel, titanium, aluminum, or any other suitable material known in the art.

As shown in FIG. 2, the metal sheet 202 can be formed with a circular machined cutout 204 to accommodate the electric motor. Two rectangular machined cutouts 206a and 206b can also be formed in the metal sheet 202. Each rectangular machined cutout 206a and 206b is surrounded by four tabs 208a–d extending from respective bending breaks 210a–d in the metal sheet 202. During the manufacturing process, the tabs 208a–d can be bent inward to form the battery compartments. The battery charger compartment can be formed in a similar manner with a rectangular cutout 212 surrounded by four tabs 214a–d extending from respective bending breaks 216a–d. Various other compartments can be formed in the metal sheet 202 depending on the particular application. The metal sheet 202 may also be formed with one or more exterior tabs 218a–f extending from respective bending breaks 220a–f along the periphery of the metal sheet 202. The exterior tabs 218a–f, once bent inward, can be used to connect the left and right members of the frame together. The metal sheet 202 may also have various screw hole cutouts (not shown) for supporting the internal components. Threaded inserts can be pressed or welded into the screw holes at a later stage during the manufacturing process.

The machining of the metal sheet can be achieved in a variety of ways. By way of example, the sheet metal pattern can be formed by laser cutting, chemical machining, water jet cutting, electron beam cutting, or any other conventional machining method. Once the sheet metal pattern is formed, the metal sheet can be shaped by manually bending the tabs, or by using a hydroforming or similar process. Alternatively, a progressive die stamp process can be used to perform both the cutting of the metal sheet and the bending of the tabs in an automated fashion. Either way, the two shaped metal sheets can then be brought together to form the frame as shown in FIG. 3. The exterior tabs 218a–f can be formed such that they butt up against, or overlap, their counterpart tabs extending from the other metal sheet. The exterior tabs from one metal sheet can then be connected to the exterior tabs from the other metal sheet by various processes including laser welding, automated welding, pinch welding, mig welding, or any other suitable process. Once the two metal sheets are connected together to form the frame, other structural members may be added. By way of example, the right and left cross-members 122a and 122b (see FIG. 1), and bearing support surfaces (not shown) can be added to support the front fork assembly 114 (see FIG. 1). The frame exterior can then be galvanized, zinc plated, painted, powder coated, or treated in any conventional manner to prevent corrosion.

FIG. 4 is a cross-sectional top view showing the electric motor secured to the frame. In the exemplary embodiment shown, the electric motor 106 serves as a structural support member of the frame 104. The electric motor 106 can be held between the two frame members 104a and 104b with a motor support tube 402 bolted to the frame 104. The back end 106a of the electric motor extends outward through the circular machined cutout of one frame member 104a. The drive shaft 106b of the electric motor 106 extends outward through the circular machined cutout of the other frame member 104b. The pulley 134 can be connected to the distal end of the drive shaft 106b. A motor support ring 404 can be bolted to the electric motor 106 to achieve a face mount.

Figure 5:
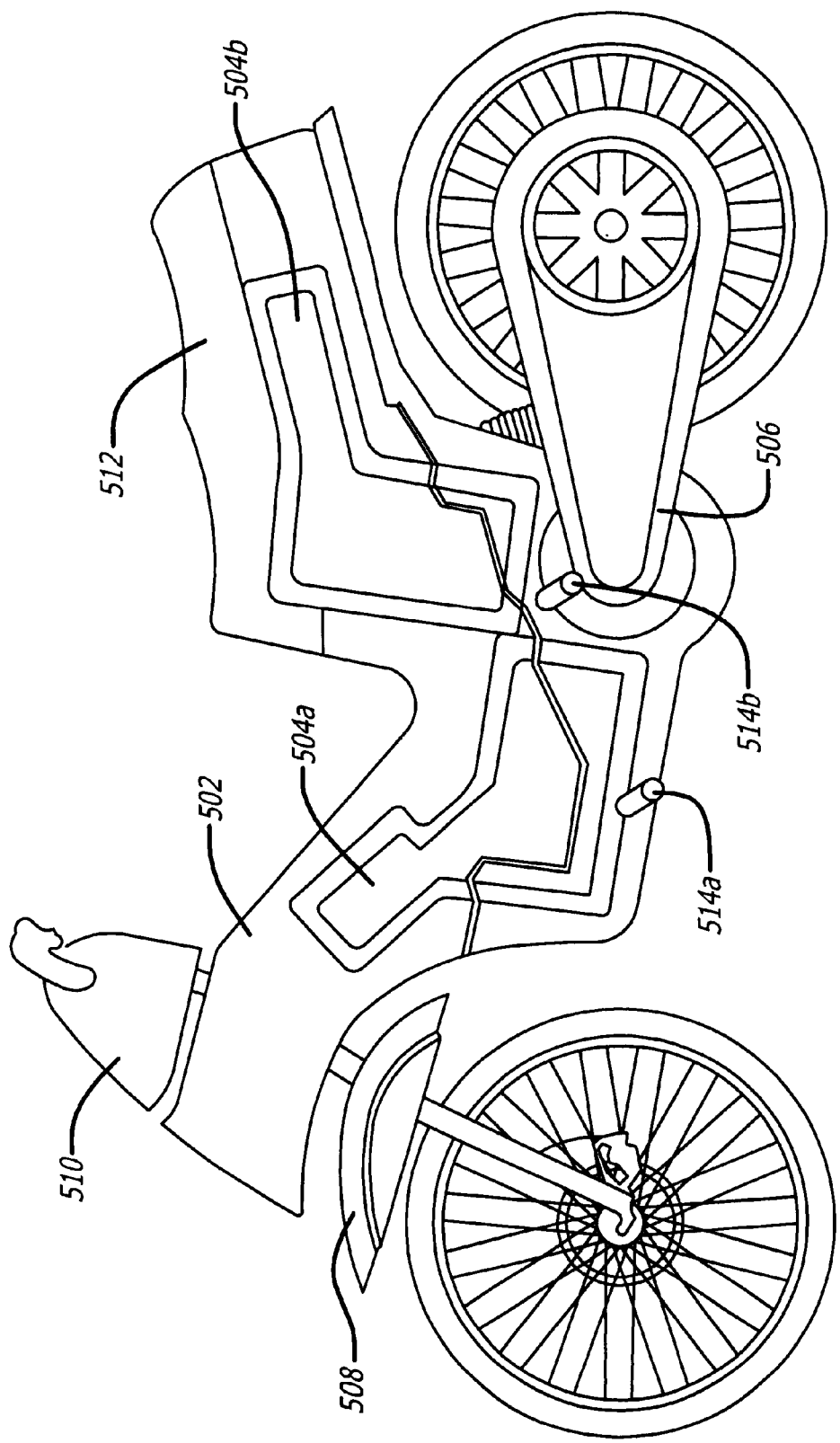
FIG. 5 is a perspective view of an exemplary electric motor driven cycle with a cosmetic overlay around the frame.

FIG. 5 is an side view of an exemplary electric motor driven cyclic with a cosmetic overlay around the frame. The overlay 502 can be plastic or any other suitable material. The use of a cosmetic overlay allows various overlay designs to be used without having to modify the frame. This approach may provide a very economical solution to support the evolution of aesthetic designs as the electric motor driven cycle industry continues to expand its penetration into the marketplace. The overlay 502 may include one or more bulges 504a and 504b to accommodate the internal components of electric motor driven cycle. A drive belt cover 506 in combination with the overlay 502 gives the electric motor driven cycle an overall aesthetically pleasing look.

The electric motor driven cycle 102 may also include a front fender 508 to house the bifurcated member 116 of the front fork assembly 114 (see FIG. 1). A pod 510 can be used to house the clamp 124 connection between the steered tube 120 and the handle bar 126 (see FIG. 1). The pod 510 may also be used to carry various displays and controls depending on the particular design requirements and the intended consumer market. The pod 510 may also provide a convenient surface to support a headlight (not shown). The electric motor driven cycle 102 may also include a passenger seat 512 and front and rear foot pegs 514a and 514b.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electric motor driven cycle, comprising:

front and rear wheels;

a monocoque frame suspended between the front and rear wheels, the frame comprising a plurality of compartments each being formed by an exterior surface thereof;

an electric motor coupled to one of the wheels; and a battery supported by one of the compartments, the battery being coupled to the electric motor.

2. The electric motor driven cycle of claim 1 wherein the electric motor is a load-bearing member of the frame.

3. The electric motor driven cycle of claim 1 wherein the electric motor is coupled to the rear wheel.

4. The electric motor driven cycle of claim 1 further comprising a motor support tube coupled to the frame, the motor support tube supporting the motor.

5. The electric motor driven cycle of claim 4 further comprising a motor support ring coupled to the electric motor.

6. The electric motor driven cycle of claim 1 further comprising a second battery supported by a second one of the compartments, the second battery being coupled to the electric motor.

7. The electric motor driven cycle of claim 1 further comprising a battery charger supported by a second one of the compartments.

8. An electric motor driven vehicle, comprising:

front and rear wheels;

a monocoque frame suspended between the front and rear wheels, the frame comprising a plurality of compartments each being formed by an exterior portion thereof;

an electric motor coupled to one of the wheels;

a battery supported by one of the compartments, the battery being coupled to the electric motor; and a handle bar extending from the frame.

9. The electric motor driven vehicle of claim 8 wherein the electric motor is a load-bearing member of the frame.

10. The electric motor driven vehicle of claim 8 wherein the electric motor is coupled to the rear wheel.

11. The electric motor driven vehicle of claim 8 further comprising a motor support tube coupled to the frame, the motor support tube supporting the motor.

12. The electric motor driven vehicle of claim 11 further comprising a motor support ring coupled to the electric motor.

13. The electric motor driven vehicle of claim 8 further comprising a second battery supported by a second one of the compartments, the second battery being coupled to the electric motor.

14. The electric motor driven vehicle of claim 8 further comprising a battery charger supported by a second one of the compartments.

* * * * *